US012633123B2

(12) United States Patent
Kumar et al.

(10) Patent No.: US 12,633,123 B2
(45) Date of Patent: May 19, 2026

(54) IDENTIFICATION OF ITEMS OF INTEREST ASSOCIATED WITH AN OBJECT BASED ON MOVEMENT IN VIDEO DATA AND SECONDARY SENSORS

(71) Applicant: DRAGONFRUIT AI, INC., Menlo Park, CA (US)

(72) Inventors: Amit Kumar, Menlo Park, CA (US); Amol Kulkarni, Karnataka (IN)

(73) Assignee: DRAGONFRUIT AI, INC., Menlo Park, CA (US)

( * ) Notice: Subject to any disclaimer, the term of this patent is extended or adjusted under 35 U.S.C. 154(b) by 144 days.

(21) Appl. No.: 18/446,790

(22) Filed: Aug. 9, 2023

(65) Prior Publication Data

US 2025/0054307 A1     Feb. 13, 2025

(51) Int. Cl.
*G06V 20/52*     (2022.01)
*G06T 7/20*     (2017.01)
*G06V 10/25*     (2022.01)

(52) U.S. Cl.
CPC ............... *G06V 20/52* (2022.01); *G06T 7/20* (2013.01); *G06V 10/25* (2022.01); *G06T 2207/30196* (2013.01); *G06V 2201/07* (2022.01)

(58) Field of Classification Search
CPC .... G06V 20/52; G06V 10/25; G06V 2201/07; G06T 2207/30196
See application file for complete search history.

(56) References Cited

U.S. PATENT DOCUMENTS

| | | | |
|---|---|---|---|
| 2009/0208067 A1* | 8/2009 | Peng ..................... | B66B 5/0012 382/165 |
| 2015/0025967 A1* | 1/2015 | Ellison ............... | G06Q 30/0261 705/14.58 |
| 2024/0071191 A1* | 2/2024 | Mullins ............ | G08B 13/19613 |

* cited by examiner

*Primary Examiner* — Kathleen V Nguyen

(57) ABSTRACT

Systems, methods, and software to identify events of interest associated with an objects movement in an environment. In at least one implementation, a management service obtains video data from a plurality of cameras for the environment. The management service further obtains an identifier associated with a person from a sensor and identifies attributes associated with the person based on the identifier. Once the person is identified, the management service can track the movement of the person in the environment prior to arriving at the sensor using the video data and can identify items of interest for a summary based on the movement of the person in the environment and the attributes associated with the person.

20 Claims, 6 Drawing Sheets

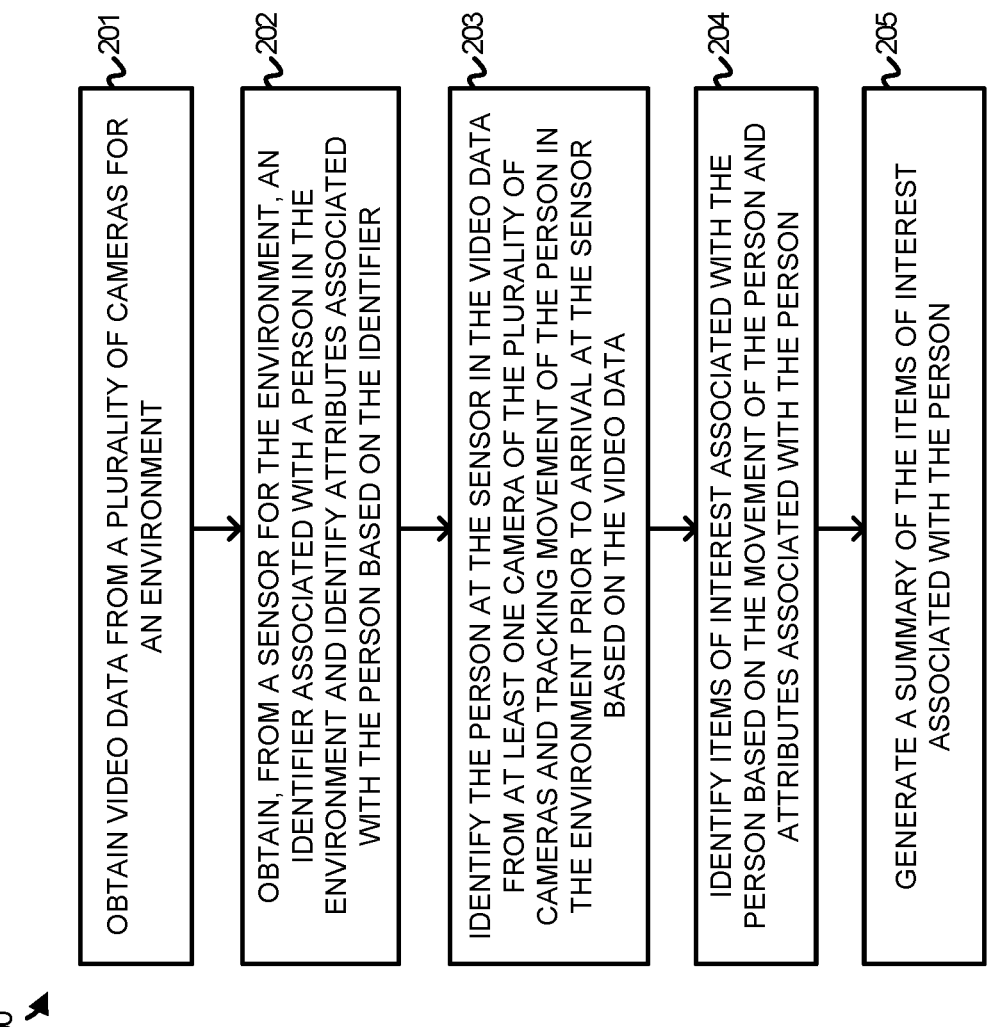

201

OBTAIN VIDEO DATA FROM A PLURALITY OF CAMERAS FOR AN ENVIRONMENT

202

OBTAIN, FROM A SENSOR FOR THE ENVIRONMENT, AN IDENTIFIER ASSOCIATED WITH A PERSON IN THE ENVIRONMENT AND IDENTIFY ATTRIBUTES ASSOCIATED WITH THE PERSON BASED ON THE IDENTIFIER

203

IDENTIFY THE PERSON AT THE SENSOR IN THE VIDEO DATA FROM AT LEAST ONE CAMERA OF THE PLURALITY OF CAMERAS AND TRACKING MOVEMENT OF THE PERSON IN THE ENVIRONMENT PRIOR TO ARRIVAL AT THE SENSOR BASED ON THE VIDEO DATA

204

IDENTIFY ITEMS OF INTEREST ASSOCIATED WITH THE PERSON BASED ON THE MOVEMENT OF THE PERSON AND ATTRIBUTES ASSOCIATED WITH THE PERSON

205

GENERATE A SUMMARY OF THE ITEMS OF INTEREST ASSOCIATED WITH THE PERSON

IDENTIFICATION OF ITEMS OF INTEREST ASSOCIATED WITH AN OBJECT BASED ON MOVEMENT IN VIDEO DATA AND SECONDARY SENSORS

BACKGROUND

Video data generated from cameras can provide insight about a variety of different environments, including businesses, residences, nature, or some other environment. As the information is obtained, the video data can be processed or viewed by different users to identify relevant events in the environment. The events can include monitoring movements of people within a store, identifying potential crimes in a store, or providing some other operation in association with the video data.

As the quantity of cameras and sensors within an environment, such as a retail store, increase, difficulties can arise in identifying events or data of interest from the cameras. Specifically, it can become difficult for an administrator to identify information about the movement of objects, the interactions of the objects, or some other information about the data. Additional difficulties can also arise when the cameras are incapable of identifying the object (e.g., person) that is moving in the environment.

Overview

Provided herein are systems, methods, and software to identify items of interest associated with an object based on the object's movement identified in video data and secondary sensor data. In at least one implementation, a method includes obtaining video data from a plurality of cameras for an environment. The method further includes obtaining from a sensor separate from the plurality of cameras, an identifier associated with a person in the environment and identifying attributes associated with the person based on the identifier. In response to obtaining the identifier, the method further includes identifying the person at the sensor in the video data from at least one camera of the plurality of cameras and tracking movement of the person in the environment prior to arrival at the sensor based on the video data. The method also provides identifying items of interest associated with the person based on the movement of the person in the environment prior to arrival at the sensor and the attributes associated with the person and generating a summary of the items of interest associated with the person.

In at least one implementation, the environment can comprise a retail store, business, or public space, and the sensor can comprise a credit card reader, a touchscreen, a keypad, a card scanner, a barcode scanner, or a near-field communication device.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2 illustrates a method of operating a management service to identify items of interest from video data of a person based on one or more secondary sensors according to an implementation.

DETAILED DESCRIPTION

Figure 1:
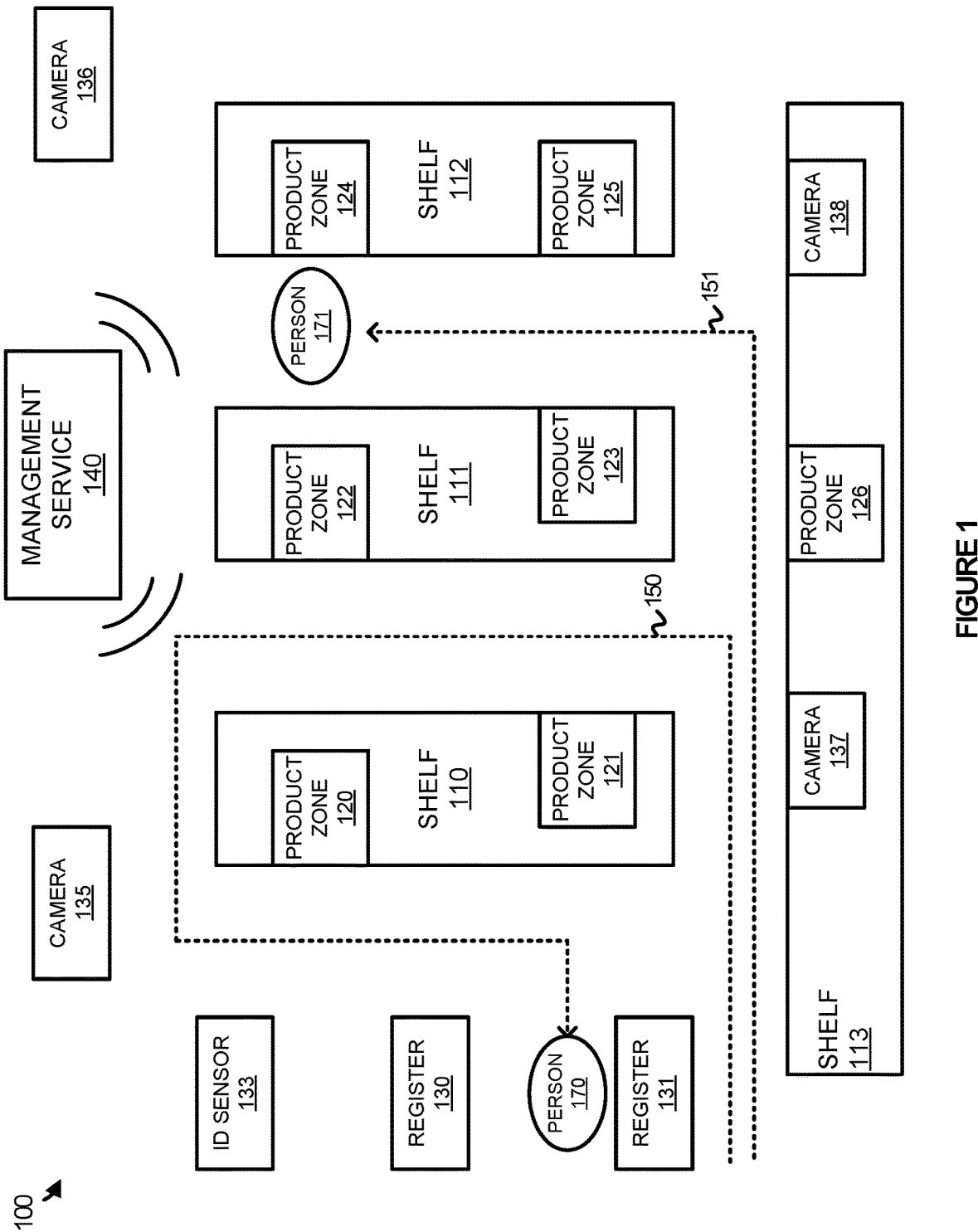
FIG. 1 illustrates a computing environment to identify items of interest in video data for a person based on one or more secondary sensors according to an implementation.

FIG. 1 illustrates a computing environment 100 to identify items of interest in video data for a person based on one or more secondary sensors according to an implementation. Computing environment 100 is representative of a retail store environment, although similar operations can be performed in other environments, such as businesses, public spaces, and the like. Computing environment 100 includes shelfs 110-113, product zones 120-126, registers 130-131, identifier sensor (ID sensor) 133, cameras 135-138, management service 140, persons 170-171, and paths 150-151. Although demonstrated with two persons in computing environment 100, an environment can include any number of persons that can be tracked or monitored via cameras 135-138.

In computing environment 100, cameras 135-138 are deployed to provide surveillance or monitoring of a retail environment. Cameras 135-138 are distributed in the environment to provide different camera angles and fields of view of the environment to monitor persons, such as persons 170-171, in the retail environment. For example, while camera 135 provides a field of view of at least shelf 110 and portions of shelf 113, camera 136 provides a field of view that includes at least shelf 112 and portions of shelf 113. Each camera of cameras 135-138 can communicate video data to management service 140. The video data can be communicated wirelessly, wired, and can be communicated in any format. Management service 140 can comprise one or more computers that are located on-site at the retail environment, can comprise one or more computers located in a cloud computing environment, or can comprise some combination thereof.

In addition to receiving the video data from cameras 135-138, management service 140 can further receive sensor data from registers 130-131 or ID sensor 133. The sensor data can include identifier information for the persons in computing environment 100, such as a unique username or customer number, a credit card number, an employee number, or some other identifier information associated with the person. Registers 130-131 and ID sensor 133 can comprise a credit card reader, a touchscreen, a keypad, a card scanner, a barcode scanner, a near-field communication (NFC) device, or some other sensor to provide the identifier information to management service 140. The identifier information can be communicated wirelessly, wired, and can be provided in any communication format to management service 140. As an example, register 131 can include an NFC device that receives information from person 170 (e.g., a unique identifier). The unique identifier can then be communicated to management service 140.

In response to receiving an identifier for a person in computing environment 100, management service 140 can track or monitor the movement of the person in the environment prior to arriving at the sensor. Returning to the example of person 170 providing identifier information to a sensor at register 131, management service 140 can then use the location of the sensor at register 131 to identify person 170 in the field of view for camera 135 or camera 137. Specifically, management service 140 may be programmed to identify portions of a video frame that correspond to a particular sensor. For example, a first portion of the frame from camera 135 can correspond to register 130 and a second portion of the frame from camera 135 can correspond to register 131. As a result, when the sensor is triggered at register 131 for person 170, management service 140 can identify the person in the second portion of the frame that corresponds to the register 131. Similar operations can be performed for multiple cameras in computing environment 100.

Once person 170 is identified at the sensor, management service 140 can then track the movement of person 170 along path 150. The tracking may include identifying one or more product zones observed by person 170, the length that the person stayed at each zone, the individual items observed or interacted with by person 170, or some other information. The information can be gathered from any of the cameras, wherein the person can be tracked by multiple cameras and/or passed between cameras as the person moves in the environment. Here, person 170 passes product zones 120-122, which can be monitored using any of cameras 135-138.

From the information about path 150 for person 170 and attribute information associated with person 170 (e.g., product preferences, purchases by the person, or other attributes associated with the unique identifier), management service 140 identifies items of interest for the person. The items of interest may represent products (or other objects in the environment), may represent regions or locations within the environment, or may represent portions of the video data itself. As an example, path 150 includes product zones 120-122, however, management service 140 can use attributes or attribute information associated with person 170 to determine that only products in product zone 122 are relevant to the person. Accordingly, one or more products (i.e., items) of interest from product zone 122 will be identified for person 170. The one or more items of interest can further be refined based on attributes indicating items that were previously purchased by person 170.

Although demonstrated in the previous example using a point of purchase or register for the sensor, similar operations can be performed to track or monitor the movement of persons separate from of point of purchase. For example, an employee can use an NFC reader or card scanner to activate a door, a computer, a facial recognition service and/or device, or some other device. The sensor can report the activity back to management service 140 and management service 140 can process attributes associated with the person and the movement (i.e., path) of the person to identify one or more items of interest. The items of interest for the employee can comprise segments or portions of the video data that are relevant for the employee, items interacted with by the employee, or some other item of interest. As an example, an employee can tap an NFC reader to enter a door. In response to using the sensor, management service 140 can identify attributes associated with the person, such as personnel position or occupation for the employee (manager, stock person, etc.) and identify locations of interest within the environment for the personnel position. The locations can then be compared to the path of the employee prior to using the sensor to determine any items of interest for the person. The items of interest can include video segments or portions when the person was in the location of interest, items interacted with in the location of interest, time spent in the location of interest, or some other item of interest. The item of interest can then be generated as a report that is communicated to the person, a manager of the environment, or some other personnel in association with the environment. Advantageously, the item of interest may not include just physical items of interest to the person, but can include video data, lengths of time in different locations, or some other non-tangible item of interest from the movement information and attributes associated with the person.

In at least one implementation, management service 140 can perform first video processing in association with a person and can initiate second video processing once the person uses a sensor in the environment. For example, first video processing can track the movement of all persons in computing environment 100 to identify portions or areas of the environment that are most frequented by persons in environment 100. When a person uses a sensor (e.g., card reader or NFC reader), management service 140 can determine whether additional processing should be performed for the person. For example, for a first person no further video processing operations are performed, while for a second person additional video processing operations are performed as described herein. Specifically, management service 140 can identify the movement of the individual person and attributes associated with the person to identify items of interest associated with the person. The items of interest can then be used to generate a summary in association with the person. Alternatively, if a person is not deemed to require additional processing after using a sensor, then no further operations will be performed for the person.

In some implementations, the identification of a person can occur at multiple instances to provide real-time or active processing in association with the person. For example, the video data or other sensors can be used to determine whether a person in the environment is a customer or an employee. This determination can be made based on the entrance of the person into the environment, such as an employee or worker entrance, can be made based on first video data identifying customer traits or employee traits, or can be based on some other identification operation. Once the person is identified as a customer or an employee, management service 140 can perform first processing operations based on the identified person type. Thus, when the person is a customer, management service 140 can perform first video processing operations, and when the person is an employee, management service 140 can perform second video processing operations. The different video processing operations can be used to determine when the person enters different areas or regions (e.g., product zones of product zones 120-126), the duration that the person is in different regions, or some other operation in association with the person. As an example, an employee may be tracked to determine when they enter product zone 125 because an employee should not be in the product zone. In contrast, a customer can be tracked to determine when they enter product zone 120. Durations, products viewed, and other information can also be made of interest from monitoring the video data in association with the person type.

In some implementations, management service 140 can evolve operations in association with a person over time as more information is gathered for the person. For example, when person 170 initially enters environment 100, management service 140 can identify the person in the video data and determine that the person is a customer based on the entrance. Management service 140 can then perform first operations based on person 170 being a customer and the video data from the cameras in environment 100. After person 170 enters the environment and starts path 150, management service 140 can gather additional information about the person, such as facial features, clothing, skin color, or any other information. The information can be used to identify at least a demographic for the person (age, sex, etc.) or can perform a guess at the identity of the person. For example, using the information from the cameras that capture path 150, management service 140 can estimate a demographic or identify of the person based on the information captured by the cameras. From the information, management service 140 can perform second operations, such as lighting up or highlighting specific products within the environment, changing screens or placards to better reflect the interests of the demographic or some other information. The demographic and identity information for the person can be constantly updated as additional information is gathered. Finally, when the person uses a sensor to verify their identity, third operations can be performed by management service 140 as described herein in association with the identity of the person. The operations can monitor products, viewed, the path of the person, locations of interest based on time spent in different regions or zones of the environment, or some other operation based on the attributes of the person and the video data monitoring the movement of the person in the environment.

Advantageously, management service 140 can provide different stages of video processing in association with the person as additional information is gathered. This permits first operations when the person is identified as a customer, second operations when information is derived about the demographics of the person, and third operations when a unique identifier is determined for the person. Although this is one example of different stages of identification, similar operations can be performed for an employee or other person as additional information is identified. Further, once a unique identifier is provided to a secondary sensor, the operations described herein for backtracking or tracking movement prior to the secondary sensor can be employed.

FIG. 2 illustrates a method 200 of operating a management service to identify items of interest from video data of a person based on one or more secondary sensors according to an implementation. Method 200 is described parenthetically in the paragraphs that follow with reference to systems and elements from computing environment 100 of FIG. 1. Method 200 can be performed using management service 140 that can reside in the same physical location of the monitored environment (e.g., local network), can be monitored in an external facility (e.g., cloud computing data center or centralized data center for the retail environment), or can be located in some combination thereof.

Method 200 includes obtaining (201) video data from a plurality of cameras for an environment. The environment may comprise a retail environment, a business, a public space, or some other environment, wherein cameras can be deployed to monitor the environment from different locations and orientations. As the video data is obtained, method 200 further includes obtaining (202), from a sensor separate from the cameras, an identifier associated with a person in the environment and identifying attributes associated with the person based on the identifier. The identifier for the person can comprise a username, a name of the person, a credit card number, or some other identifier of the person. The attributes associated with the person can comprise a variety of information, such as purchase information associated with the person, job title or personnel position in an organization, personal defined preferences, or some other information. For example, if the person is a customer, the attributes can indicate previous purchases associated with the person, can indicate product interests associated with the person, or can provide some other information associated with the person. Additionally, the attributes can provide information about color preferences of the person (e.g., clothing color preferences), the age and/or gender demographic of the person, brands of interest for the person, or some other attributes of the person. The attributes can be derived via a profile provided by the person indicating the information or can be derived at least in part from video data gathered in association with the person. The video data can identify brands for the person, colors of the person, or some other information for the person. In at least one implementation, the profile information can be shared across multiple persons, wherein preferences for a first person in a first demographic can be applied to a second person that applies to the first demographic.

In addition to identifying the attributes associated with the person, method 200 further includes identifying (203) the person at the sensor in the video data from at least one camera of the plurality of cameras and tracking movement of the person in the environment prior to arrival at the sensor based on the video data. In at least one implementation, management service 140 can be configured to identify a person in a particular portion of a field of view that includes that sensor. For example, a portion of the field of view for camera 135 can be associated with register 131, such that when a person uses a sensor associated with register 131, management service 140 can identify person 170 in the field of view. Once identified, person 170 can be tracked along path 150 using a combination of any of the cameras 135-138. The tracking may identify product zones passed by person 170, individual items viewed or interacted with by person 170, the length of time in each of the zones, or some other tracking information.

After tracking the movement of the person, method 200 further includes identifying (204) items of interest associated with the person based on the movement of the person in the environment prior to arrival at the sensor and the attributes associated with the person. In one example, the items of interest may correspond to one or more products (or other similar physical items) that were observed or interacted with by the person but not yet purchased by the person. For example, the person may interact with six physical items in the environment but purchase four of the items (identified via the attributes associated with the person). Thus, the remaining two items that were not purchased can be identified as an interest for the person. Other information can also be considered, such as preferences of the person, purchases from previous times in the environment, purchase habits in association with other similar environments (e.g., similar retail environments), and the like.

In another implementation, rather than using the purchase history and/or profile preferences associated with the person, the sensor can provide an identifier associated with the employee of an organization associated with the environment. From the identifier information, management service 140 can identify a personnel type associated with the person, locations of interest associated with the person within the environment, or some other information associated with the employee. For example, while a first employee can be associated with a first region of interest in the environment that is identifiable by the cameras, a second employee can be associated with a second region of interest in the environment that is identifiable by the cameras. When the person provides information at a scanner (e.g., touchscreen, NFC device, etc.), management service 140 can track the person's movement prior to using the sensor, including the path or route of the person and the duration at different locations. If the person satisfies criteria of being in a region of interest in the environment (e.g., in the region of interest for a period, such as near product zone 120 for a threshold period), then a portion of the video data corresponding to when the person is in the region of interest can be identified as an item of interest. The portion of video data can comprise video data from cameras that capture the region of interest during the period. Here, the portion of video data would be an item of interest.

Once the items of interest are identified for a person in the environment, method 200 further includes generating (205) a summary of the items of interest associated with the person. The summary may comprise an email, a text, an application notification, or some summary that can be provided to the person or an administrator associated with computing environment 100. As an example, if the person comprises a customer, the summary can comprise an email that indicates the items of interest for the person (e.g., items viewed but not yet purchased by the person). The summary can further indicate special discounts, pricing information, or some other information for the person. In another implementation, when the person comprises an employee, a notification can be communicated to an administrator of the computing environment that includes video portions as the items of interest, permitting the administrator to identify activities associated with the employee.

Although purchasing and monitoring employee movement are described in the previous two examples, similar operations can be performed to monitor and identify other objects. For example, operations could further be performed on robots or vehicles within an environment to monitor the movement and determine items of interest based on information (i.e., profile) associated with the robot or vehicle.

In some implementations, management service 140 can change video processing operations and actions as additional information is identified for a person, wherein the information can be gathered via the cameras and/or the sensors in the environment. As an example, the cameras can be used to first identify whether a person is an employee or a customer (can be based on clothing, the entrance of the person, etc.). From the identification of the person, management service 140 can determine when the person enters areas of interest associated with the person type, stays in an area of interest for a period, moves or selects items at a particular area, or performs some other operation. If an operation is performed (e.g., person enters an area of interest), management service 140 can communicate a notification to an administrator, can log the video data associated with the movement, or perform some other action.

After the first identification of the person, management service 140 can use the video and sensor data to identify additional information for the person. The information can include attributes of the person associated with a demographic for the person, a unique identifier for the person (using sensor data), or some other information associated with the person. Once a demographic is identified for the person, actions can be taken associated with the demographic, such as providing advertisements, sending personnel to assist the person, or performing some other action in association with the demographic. The advertisements and/or personnel can be directed to a particular location and path tracked for the person. Additionally, when a unique identifier is determined for the person (e.g., using a touchpad), the path can be tracked as described previously for the person and action can be taken uniquely for the person. The actions can include communicating advertisements based on the path when the person is a customer, communicating notifications to the customer based on the customer profile and path in the environment, providing a notification or summary of employee movement in an environment when the person is an employee, or providing some other action in association with the unique identifier for the person and the path of the person. Advantageously, as additional information is derived for the person, additional and/or replacement processing can be initiated, and actions can be performed based on the processing. Thus, as more information is identified, the actions can be more specific for the individual person.

Figure 3:
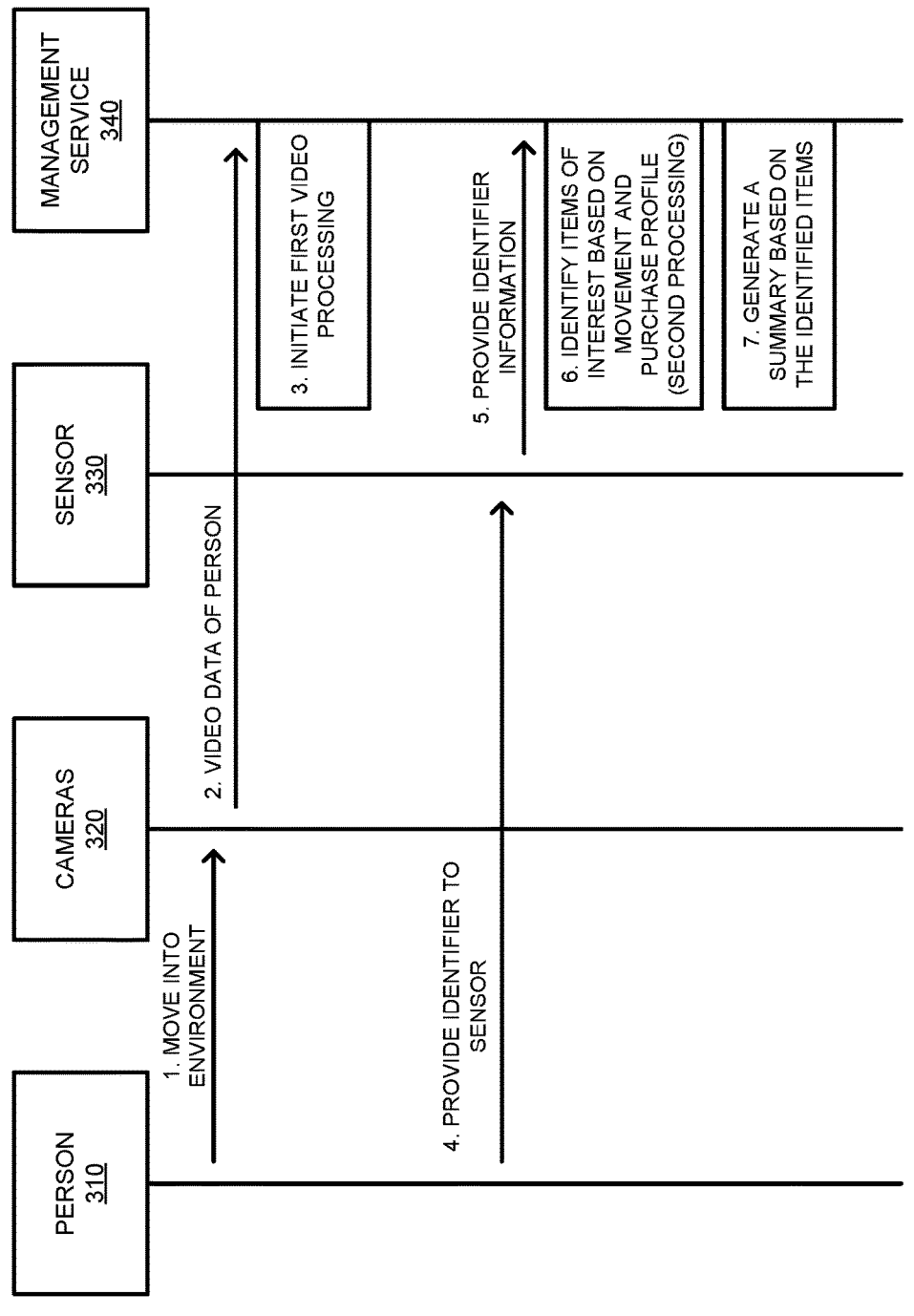
FIG. 3 illustrates a timing diagram of processing video data and secondary sensor data to identify items of interest to a person according to an implementation.

FIG. 3 illustrates a timing diagram 300 of processing video data and secondary sensor data to identify items of interest to a person according to an implementation. Timing diagram 300 includes person 310, cameras 320, sensor 330, and management service 340.

In timing diagram 300, person 310 enters an environment that is monitored by cameras 320 at step 1, wherein cameras 320 can provide video data of the environment and the person to management service 340 at step 2. When person 310 enters the environment and is detected by management service 340, management service 340 can perform first video processing in association with the person. In some implementations, the first video processing can comprise anonymized video processing, such as monitoring "hot spots" or frequently visited portions of the environment, identifying the duration that the person is in the environment, or some other anonymous monitoring associated with person 310. In some implementations, no video processing will be provided by management service 340 prior to an identifier of the person by at least one sensor in the environment.

After the person enters the environment and video data is captured of the person, sensor 330 can receive identifier information about person 310 at step 4 and provide the identifier information to management service 340 at step 5. Sensor 330 can comprise a card reader, a barcode or QR code scanner, a touchscreen, a keypad, or some other sensor capable of receiving identifier information from person 310. For example, person 310 can provide a phone number at a register, wherein the phone number can be provided via a touchscreen at the register. After receiving the identifier information, management service 340 identifies items of interest for person 310 based on movement of the person prior to interacting with sensor 330 and a purchase profile associated with the person at step 6. The purchase profile information can be representative of attributes associated with the person, wherein the purchase profile can indicate items purchased by the person, items previously viewed by the person (either in the current retail environment or in another environment, such as another store or online), preferences indicated by the person, or some other information. The movement information can be determined by tracking the movement of the person in the video data from cameras 320 prior to the input at the sensor. Specifically, at least one camera of cameras 320 can capture the person at the sensor (management service 340 can be configured to identify the person at the sensor), and then use a combination of the cameras 320 to track the movement of the person.

Once the items of interest are identified, management service 340 generates a summary based on the identified items of interest at step 7. In some implementations, the summary may comprise an email, text, or other notification that can be delivered to the person indicating the items of interest to person 310. For example, by tracking the person in the environment, management service 340 can identify one or more items that were viewed or interacted with by person 310 and can use the purchase profile associated with person 310 to determine that the one or more items were not purchased by the person. Accordingly, the summary can indicate information about the one or more items, including the name of the item, the price of the item, any upcoming specials or deals associated with the item, or some other information. Advantageously, while person 310 can view or interact with five items while in the environment and only purchase two of the items, a summary can be generated that indicates the three remaining items and any additional information associated with the three remaining items.

Figure 4:
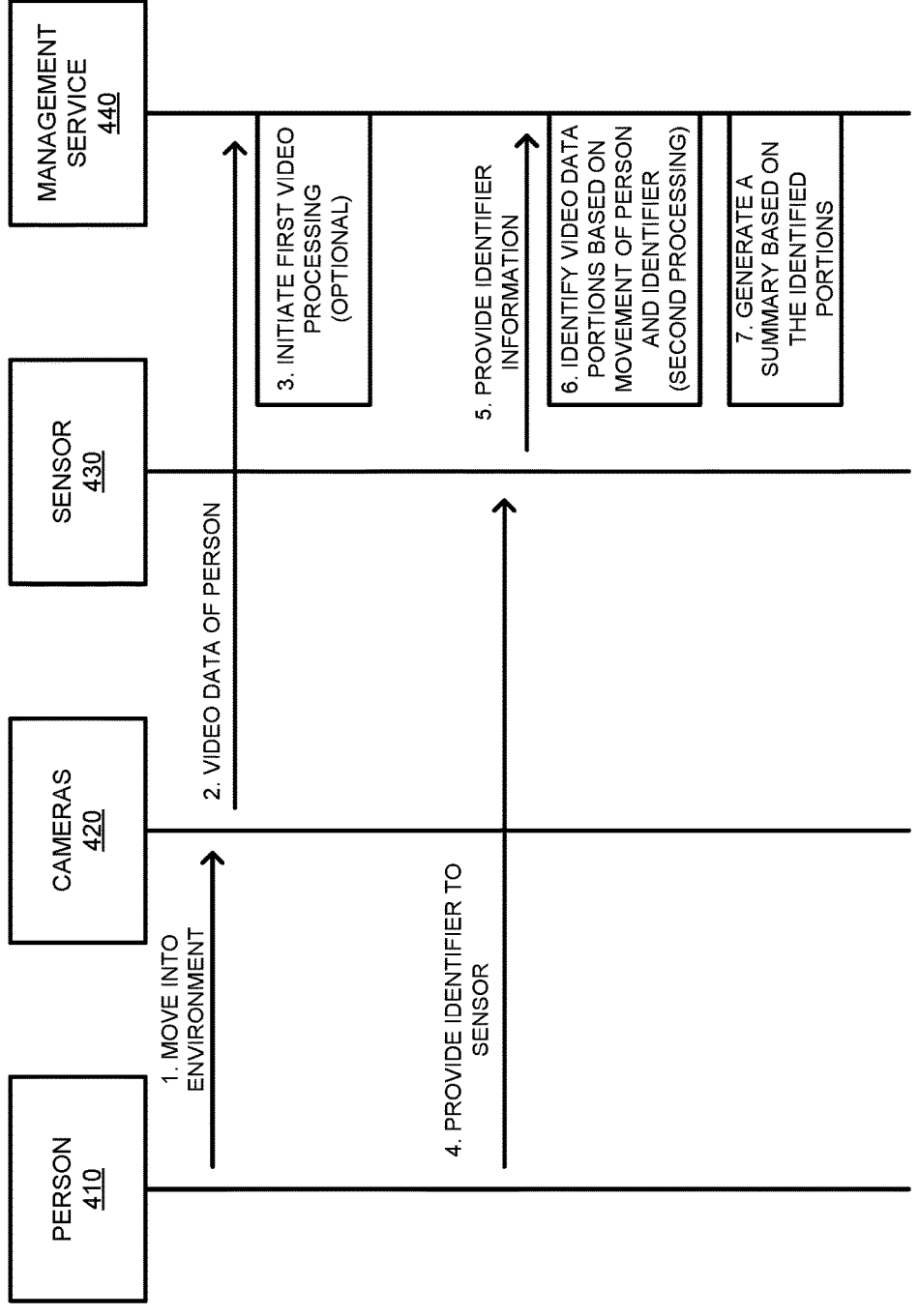
FIG. 4 illustrates a timing diagram of processing video data and secondary sensor data to identify movement of interest for a person according to an implementation.

FIG. 4 illustrates a timing diagram 400 of processing video data and secondary sensor data to identify movement of interest for a person according to an implementation. Timing diagram 400 includes person 410, cameras 420, sensor 430, and management service 440.

In timing diagram 400, person 410 enters an environment that is monitored by cameras 420 at step 1, wherein cameras 420 can provide video data of the environment and the person to management service 440 at step 2. When person 410 enters the environment and is detected by management service 440, management service 440 can perform first video processing in association with the person. In some implementations, the first video processing can comprise anonymized video processing, such as monitoring "hot spots" or frequently visited portions of the environment, identifying the duration that the person is in the environment, or some other anonymous monitoring associated with person 410. In some implementations, no video processing will be provided by management service 440 prior to an identifier of the person by at least one sensor in the environment.

While person 410 in in the environment, the person provides identifier information to sensor 430 at step 4 and sensor 430 forwards identifier information to management service 440 at step 5. Sensor 430 can comprise an NFC device, a keycard scanner, or some other sensor. As an example, person 410 can use an identifier card to log into a computer or register or can use an NFC device to open a door in the environment. The information gathered from these interactions with sensor 430 can be communicated to management service 440 (e.g., an employee number, employee name, or other identifier information from the device).

After receiving the identifier information, management service 440 identifies video data portions of interest based on the movement of person 410 prior to interacting with sensor 430 and attributes determined for the person based on the personal identifier at step 6. For example, when person 410 interacts with sensor 430 or sensor 430 otherwise obtains the identifier from person 410, the information is forwarded to management service 440, permitting management service 440 to identify additional attributes associated with person 410. The additional attributes, when person 410 is representative of an employee, can include the position of the employee, locations of interest within the environment for the employee, or some other information associated with the employee. Management service 440 can then identify, using the video data from cameras 420, the path that person 410 used in the environment to arrive at sensor 430, wherein management service 440 can identify the person in at least one camera and backtrack the path of the person from step

1. In tracking the path of the person, management service 440 can consider the locations in the environment visited by the person, wherein locations can be mapped to different portions in the field of view for each of cameras 420, can monitor the duration that the person remains at each of the locations, can monitor one or more objects interacted with by the person, or can provide some other information about the movement of the person based on the video data from cameras 420.

In some implementations, management service 440 can identify portions of the video data as the items of interest. As an example, the profile of the person can indicate locations of interest of the person or objects of interest for the person. When the person is in the location for a threshold period or interacts with an object of interest, portions of the video data from cameras 420 can be identified as items of interest associated with person 410. Once video data portions are identified, a summary is generated based on the identified portions at step 7. In some implementations, the summary can be generated for a supervisor or administrator associated with the environment. The summary can include the relevant video portions identified from the cameras in the environment, can provide statistics about the movement of the person in the environment, or can provide some other information in association with the movement of the person prior to interacting with the sensor. The summary can be provided as part of a standalone application for the administrator, an email, a web application, or by some other mechanism. In some implementations, a summary will only be generated when one or more items of interest are identified (e.g., video portions). For example, if the movement of the person within the environment does not satisfy any criteria to generate an item of interest, then no summary will be generated for the person. Additionally, tracking operations may only be performed for specific persons in the environment. For example, while a first person may trigger the tracking operations and identification of items of interest, a second person may not trigger tracking operations in the environment. The determination can be based on the identifier of the person provided by the sensor.

Figure 5:
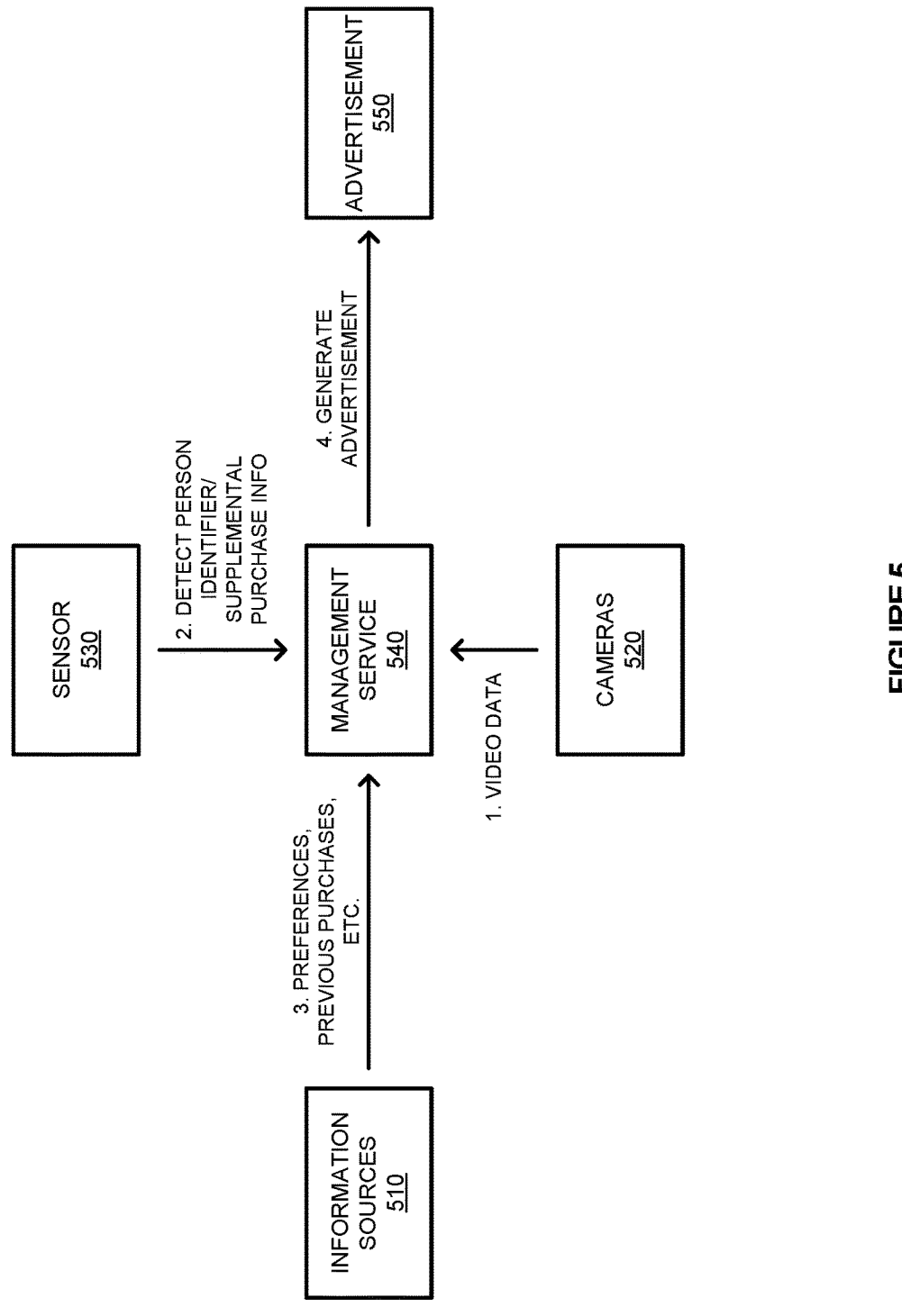
FIG. 5 illustrates an operational scenario of generating recommendations for a person based on video data and secondary sensor information according to an implementation.

FIG. 5 illustrates an operational scenario 500 of generating recommendations for a person based on video data and secondary sensor information according to an implementation. Operational scenario 500 includes information sources 510, cameras 520, sensor 530, management service 540, and advertisement 550. Although demonstrated in the example of operational scenario 500 of tracking person movement to determine an advertisement, similar operations can be performed to monitor any person prior to interaction with a sensor.

In operational scenario 500, cameras 520 provide video data at step 1 to management service 540. As the video data is provided, sensor 530 detects a person identifier at step 2. Sensor 530 can comprise a card reader, a barcode reader, an NFC device, a touchscreen, or some other sensor capable of identifying a person. In response to identifying the person, management service 540 can obtain supplemental information from the sensor, such as current purchases of the person, and can further obtain preferences of the person, previous purchase information of the person, or some other information from information sources 510 at step 3. These other information sources can include a database associated with the environment (e.g., a store profile), can comprise an email mailing list, or can comprise some other information source for the person identified by sensor 530.

As an example, a person may enter a store and select various items for purchase, wherein sensor 530 can identify the person based on a personal identifier (e.g., phone number). In response to identifying the person, management service 540 can identify the items that are currently being purchased by the person, previous items that have been purchased by the person via information sources 510, profile preferences of the person from information sources 510, or some other information.

In addition to the information from sensor 530 and information sources 510, management service 540 can further monitor the movement of the person within the environment via the video data from cameras 520. In at least one implementation, management service 540 can identify the person in a field of view for at least one camera of cameras 520 based on the identity of sensor 530, such as a register in a store. Once the person is identified in the field of view, management service 540 can use the video data from any combination of the camera to monitor the movement of the person in the environment. In some examples, cameras can be mapped to distinct regions and/or objects in the environment to identify the length of time that the person is in a particular region, the types of objects accessed or viewed by the person, or some other information. For example, the monitoring can be used to determine that the person spent a first period viewing a first object that was not purchased and spent a second period viewing a second object that was purchased. If the person remains in a region or accesses an object for a threshold period but does not purchase an object from the region (based on information from sensor 520), management service 540 can identify one or more of the objects as being items of interest to the person. Management service 540 can then generate an advertisement 550 that can be provided to the person. The advertisement can be communicated via email, via text, via mail, via web advertisement, or some other mechanism. Although this is one example of determining the objects of interest for a person, management service 540 can further consider the interest of the person from the profile and the movement of the person in the environment to identify other objects of interest. In some implementations, an object of interest may not be present within the environment but can be promoted in advertisement 550 based on other objects identified from the monitored movement. For example, if the movement of the person indicated an affinity to video games, then other video games can be promoted as part of advertisement 550.

In some implementations, the processing associated with a person can be performed in stages. For example, first processing and actions can be performed during a first period, second processing and actions can be performed during a second period, and third processing and actions can be performed during a third period. As an example, when a person first enters an environment, management service 540 can determine a type associated with the person (e.g., for a retail environment, a determination of employee of customer). The determination can be based on where the person entered the environment, areas visited in the environment, or the like). In some examples, the determination can be based on the video data provided by the cameras of the environment. Once the type is identified for the person, management service 540 can initiate first video processing operations in association with the type. For example, a customer can include identifying areas of interest or "hot spots" for the customers in the environment, time in the environment, or some other general monitoring operation for a customer. In contrast, an employee can include determining whether the employee enters regions of interest (e.g., areas off-limits to the employee), time spent in different regions, or some other information. The processing can be used to generate alerts, generate summaries of customer movement, or provide some other operation.

After the initial processing, management service 540 can further use the video data from cameras 520 to narrow a classification for the person, such as a demographic for the person. The video data can be analyzed to estimate an age, sex, color preferences, product or brand preferences, and the like. For example, the video data can be processed to identify brands being worn by the person, the age of the person, and the sex of the person. From the information, management service 540 can generate targeted advertisements within the environment that can be presented to the person. The adds can indicate potential products of interest to the person, can advertise the locations of the products within the environment, or can provide some other information to the person. Management service 540 can further highlight or promote products within the environment using lighting, sounds, or some other mechanism based on the demographic associated with the person. In some implementations, management service 540 can maintain a database that associates demographic information with potential products, wherein the promotions for a particular person can be updated as additional demographic information is gathered for the person. The information about the person can be gathered via the video data, any sensors interacted with in the environment, or some other mechanism in the environment. For example, a first camera can provide information that indicates that a person is female, while a second camera, later, can identify that the person is in the twenty to thirty age range. As more information is gathered, the product suggestions for the person can be updated. Additionally, the database for the demographic can be updated with preference information from the person as the person selects products to purchase, views products, or performs some other action in association with the environment. The updated database can be used in association with future persons. In some examples, the product recommendations for the different demographics can be provided or manually entered by an administrator, can be determined via observation of different persons, or some combination thereof.

Moreover, as described previously in FIGS. 1-5, once a unique identifier is determined for a person via the secondary sensor, further operations can be performed via back-tracking the path of the person and comparing the path to attributes associated with the person. The attributes can comprise purchases of the person, interests specifically identified in association with the person (via purchases, or user input), areas and/or regions of interest associated with the person, or some other information associated with the individual person. The operations can identify one or more products of interest, product regions of interest, and the like. The operations can be used to generate advertisements or other notifications that can be provided via email, text, or some other communication to the person, wherein the advertisements can include the identified products, prices, specials, or some other information based on the movement of the person in the environment and the attributes of the person.

Advantageously, using the previous examples, management service 540 can perform different operations as additional information is gathered for the person. In some implementations, only a first operation can be performed if no demographic information is determined. In other implementations, the demographic operations can be performed for the person, but no individual operations are performed if no unique identifier can be determined for the person from a secondary sensor. For example, if the person walks through the retail environment without being identified by a secondary sensor, or cannot be uniquely identified via the secondary sensor, then management service 540 will perform operations consistent with the identified demographic information and person type (customer/employee) and will not provide the person specific operations described herein.

Figure 6:
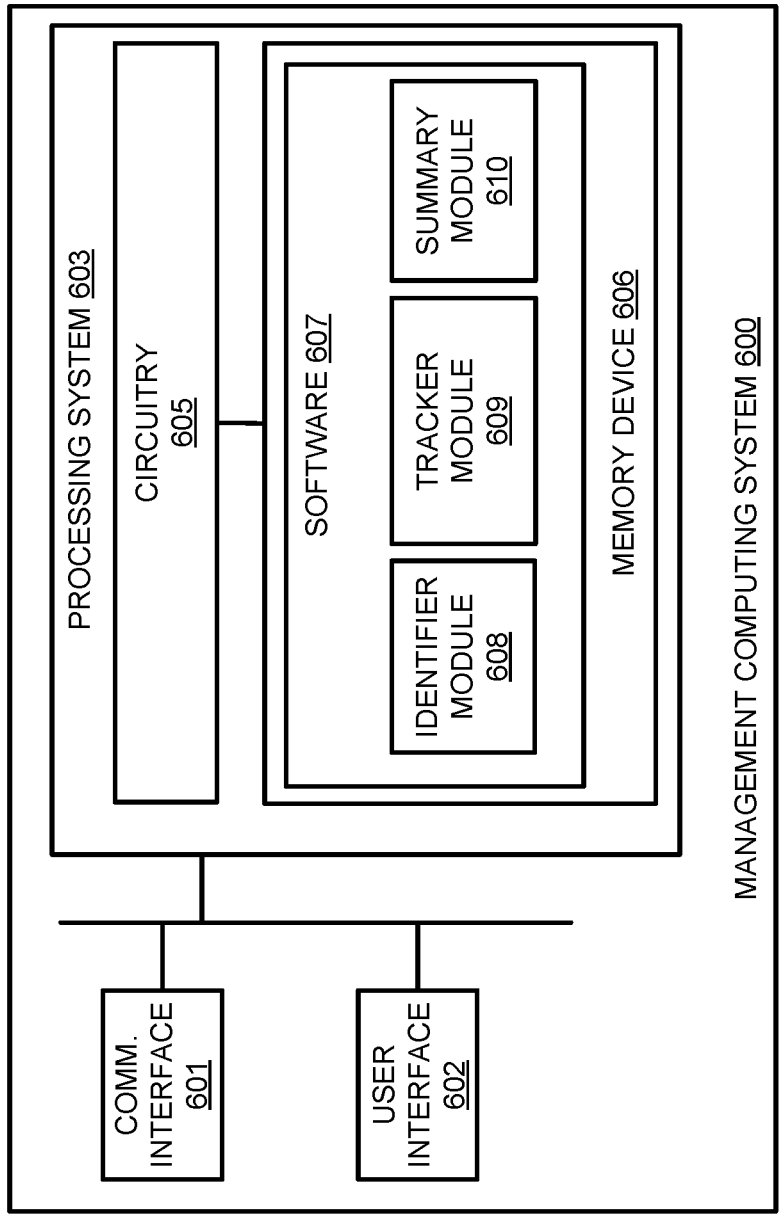
FIG. 6 illustrates a management computing system to identify items of interest for a person based on video data and secondary sensors according to an implementation.

FIG. 6 illustrates a management computing system 600 to identify items of interest for a person based on video data and secondary sensors according to an implementation. Computing system 600 is representative of any computing system or systems with which the various operational architectures, processes, scenarios, and sequences disclosed herein for a management service, such as management service 140 of FIG. 1. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 can communicate with sensors and cameras in an environment. In some examples, communication interface 601 can also communicate with a controller and/or console device to receive configuration information and provide summary information to an administrator.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. In some implementations, user interface 602 may permit a user to request and process various video data stored in multiple storage locations. User interface 602 may be omitted in some examples.

Processing circuitry 605 comprises microprocessor (i.e., at least one processor) and other circuitry that retrieves and executes operating software 607 from memory device 606. Memory device 606 may include volatile and nonvolatile, removable, and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes identifier module 608, tracker module 609, and summary module 610, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein. In at least one example, operating software 607 directs processing system 603 to implement at least operation 200 described above with respect to FIG. 2.

In one implementation, identifier module 608 directs processing system 603 to obtain video data from a plurality of cameras, wherein the plurality of cameras monitors an environment. The environment can comprise a business, a retail space, a public space, or some other environment. Identifier module 608 further directs processing system 603 to obtain, from a sensor, an identifier associated with a person in the environment and identify attributes associated with the person based on the identifier. In some implementations, sensors, such as touchpads, NFC devices, scanners, or some other sensor can be used to receive an identifier associated with a person. The identifier can comprise a phone number, a unique person identifier, or some other identifier. The identifier is communicated from the sensor to management computing system 603, wherein identifier module 608 can use the identifier to determine additional attributes associated with the person. In a retail environment, the additional attributes can include preferences of the person defined in a profile, previous purchases or current purchases associated with the person, or some other information. In a workplace environment (e.g., factory floor or other business), the attributes can define the position or occupation of the person, the attributes can define the locations of interest for the person (locations desired for the person, locations undesired for the person, etc.), or the attributes can define some other information about the person or types of movement to be monitored in the environment.

Once the person is identified via the sensor, tracker module 609 directs processing system 603 to identify the person at the sensor in the video data from at least one camera of the plurality of cameras. In some examples, tracker module 609 may identify the person that is closest in the field of view of at least one camera to the sensor, wherein the location of the sensor in the field of view can be defined by an administrator associated with the environment. After identifying the person at the sensor in the video data, tracker module 609 further directs processing system 603 to track movement of the person in the environment prior to arrival at the sensor based on the video data. For example, in a retail environment, the person can use a sensor at a register to provide an identifier of the person. Tracker module 609 can then backtrack to follow the movement of the person within the retail environment. The movement tracked can include locations visited within the environment, the time or duration spent in each of the locations or regions, the items viewed and length of view for the various items, or some other information in association with the person in the environment.

After the movement of the person in the environment is determined, summary module 610 directs processing system 603 to identify items of interest associated with the person based on the movement of the person in the environment prior to arrival at the sensor and the attributes associated with the person and generate a summary of the items of interest associated with the person. The items of interest may correspond to objects or products, may correspond to locations within the environment, may correspond to portions of the video data, or may correspond to some other item of interest for the person.

In one example, tracking of a customer in a retail environment can indicate different products that the customer viewed or interacted with, while the attributes for the customer can indicate the products that were previously purchased by the person or preferred by the person via a profile. The items of interest can comprise items that are identified as viewed by the person, but not yet purchased, and can further be selected based on the person's interest into a particular topic. For example, when a person views a particular video game for threshold period, the video game can be compared to previous purchases and/or preferences of the person to determine whether the video game is of interest to the person. If the video game is of interest, the video game can be added as part of the summary. The summary can comprise an advertisement that indicates the one or more items of interest, price drops or other promotions associated with the items of interest, or some other information for the person.

In another example, the tracking of an employee can indicate locations or regions that the employee visits in the environment, the length of time at the different locations or regions, objects interacted with by the employee, the length of time that the objects are interreacted with (e.g., machinery), or some other information. The attributes associated with the person can indicate the occupation of the person, locations or regions of interest for the person within the environment, or some other information associated with a profile for the person. In some examples, the profile can be defined based on the occupation, wherein any person with the same occupation can be associated with similar attributes. In identifying the items of interest, summary module 610 can determine periods when the person was in the region of interest based on the video data, identify the video portions that correspond to the periods, and use the video portions as the items of interest to be provided in the summary. For example, a person may enter a region of interest that is defined as it is off limits to the person. Summary module 610 can identify periods when the person is in the region of interest (based on the monitored movement of the person) and select video data that corresponds the periods as the one or more items of interest for the summary. In some implementations, the person must be in the region of interest for a threshold length to qualify the video data for the region to be included in the summary. The summary can be provided to the person or can be provided to an administrator associated with the environment.

The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
obtaining video data from a plurality of cameras, wherein the plurality of cameras monitors an environment;
obtaining, from a sensor, an identifier associated with a person in the environment who has arrived at the sensor,
identifying attributes associated with the person based on the identifier;
after obtaining the identifier, identifying the person at the sensor in the video data from at least one camera of the plurality of cameras;
after identifying the person, tracking movement of the person in the environment prior to arrival at the sensor based on the video data;
identifying items of interest associated with the person based on the movement of the person in the environment prior to arrival at the sensor and the attributes associated with the person; and
generating a summary of the items of interest associated with the person.

2. The method of claim 1, wherein the sensor comprises a credit card reader, a touchscreen, a keypad, or near-field communication device.

3. The method of claim 1,
wherein the attributes comprise items purchased by the person,
wherein tracking the movement of the person in the environment prior to arrival at the sensor based on the video data comprises identifying items viewed by the person in the environment, and
wherein the items of interest comprise a difference between the items viewed by the person and the items purchased by the person.

4. The method of claim 1,
wherein the attributes comprise areas of interest for the person in the environment;
wherein the items of interest comprise portions of the video data when the person is in the areas of interest.

5. The method of claim 1,
wherein the attributes comprise areas of interest for the person in the environment;
wherein the items of interest comprise portions of the video data;
wherein identifying the items of interest associated with the person based on the movement of the person in the environment prior to arrival at the sensor and the attributes associated with the person comprises:
determining a duration that the person is in each of the areas of interest in the environment;
identifying one or more of the areas of interest with a duration of the durations that satisfy a threshold length; and
identifying the portions of the video data that capture the one or more areas of interest with the person.

6. The method of claim 1, wherein the environment comprises a retail store, business, or public space.

7. The method of claim 1, wherein tracking movement of the person in the environment prior to arrival at the sensor based on the video data comprises:
identifying one or more items viewed by the person; and identifying a duration of view for each of the one or more items by the person.

8. The method of claim 7, wherein identifying the items of interest associated with the person based on the movement of the person in the environment prior to arrival at the sensor and the attributes associated with the person comprises identifying one or more items of interest with durations of view that exceed a threshold period.

9. The method of claim 1 further comprising:

performing anonymized video processing on the video data, wherein the anonymized video processing determines a frequency that the person and one or more additional persons access different locations in the environment.

10. A computing apparatus comprising:

a storage system;

a processing system operatively coupled to the storage system; and program instructions stored on the storage system that, when executed by the processing system, direct the processing system to:

obtain video data from a plurality of cameras, wherein the plurality of cameras monitors an environment;

obtain, from a sensor, an identifier associated with a person in the environment who has arrived at the sensor;

identify attributes associated with the person based on the identifier;

after obtaining the identifier, identify the person at the sensor in the video data from at least one camera of the plurality of cameras;

after identifying the person, track movement of the person in the environment prior to arrival at the sensor based on the video data;

identify items of interest associated with the person based on the movement of the person in the environment prior to arrival at the sensor and the attributes associated with the person; and generate a summary of the items of interest associated with the person.

11. The computing apparatus of claim 10, wherein the sensor comprises a credit card reader, a touchscreen, a keypad, or near-field communication device.

12. The computing apparatus of claim 10, wherein the attributes comprise items purchased by the person, wherein tracking the movement of the person in the environment prior to arrival at the sensor based on the video data comprises identifying items viewed by the person in the environment, and wherein the items of interest comprise the difference of the items viewed by the person and the items purchased by the person.

13. The computing apparatus of claim 10, wherein the attributes comprise areas of interest for the person in the environment;

wherein the items of interest comprise portions of the video data when the person is in the areas of interest.

14. The computing apparatus of claim 10, wherein the attributes comprise areas of interest for the person in the environment;

wherein the items of interest comprise portions of the video data;

wherein identifying the items of interest associated with the person based on the movement of the person in the environment prior to arrival at the sensor and the attributes associated with the person comprises:

determining a duration that the person is in each of the areas of interest in the environment;

identifying one or more of the areas of interest with a duration of the durations that satisfy a threshold length; and identifying the portions of the video data that capture the one or more areas of interest with the person.

15. The computing apparatus of claim 10, wherein the environment comprises a retail store, business, or public space.

16. The computing apparatus of claim 10, wherein tracking movement of the person in the environment prior to arrival at the sensor based on the video data comprises:

identifying one or more items viewed by the person; and identifying a duration of view for each of the one or more items by the person.

17. The computing apparatus of claim 16, wherein identifying the items of interest associated with the person based on the movement of the person in the environment prior to arrival at the sensor and the attributes associated with the person comprises identifying one or more items of interest with durations of view that exceed a threshold period.

18. A system comprising:

a plurality of cameras;

a sensor; and a management computer operatively coupled to the plurality of cameras and the sensor and configured to:

obtain video data from the plurality of cameras, wherein the plurality of cameras monitors an environment;

obtain, from the sensor, an identifier associated with a person in the environment who has arrived at the sensor;

identify attributes associated with the person based on the identifier;

after obtaining the identifier, identify the person at the sensor in the video data from at least one camera of the plurality of cameras;

after identifying the person, track movement of the person in the environment prior to arrival at the sensor based on the video data;

identify items of interest associated with the person based on the movement of the person in the environment prior to arrival at the sensor and the attributes associated with the person; and generate a summary of the items of interest associated with the person.

19. The system of claim 18, wherein the sensor comprises a credit card reader, a touchscreen, a keypad, or near-field communication device.

20. The system of claim 18, wherein the attributes comprise areas of interest for the person in the environment;

wherein the items of interest comprise portions of the video data;

wherein identifying the items of interest associated with the person based on the movement of the person in the environment prior to arrival at the sensor and the attributes associated with the person comprises:

determining a duration that the person is in each of the areas of interest in the environment;

identifying one or more of the areas of interest with a duration of the durations that satisfy a threshold length; and identifying the portions of the video data that capture the one or more areas of interest with the person.

* * * * *